(12) United States Patent
Hillel et al.

(10) Patent No.: US 8,904,750 B2
(45) Date of Patent: Dec. 9, 2014

(54) GAS TURBINE ENGINE VARIABLE AREA EXHAUST NOZZLE

(75) Inventors: Malcolm L. Hillel, Derby (GB); Stephen G. Brown, Derby (GB)

(73) Assignee: Rolls-Royce PLC, London (GB)

( * ) Notice: Subject to any disclaimer, the term of this patent is extended or adjusted under 35 U.S.C. 154(b) by 1278 days.

(21) Appl. No.: 12/585,077

(22) Filed: Sep. 2, 2009

(65) Prior Publication Data

US 2010/0107600 A1   May 6, 2010

(30) Foreign Application Priority Data

Nov. 5, 2008  (GB) .................................. 0820174.1

(51) Int. Cl.
| | |
|---|---|
| F02K 3/075 | (2006.01) |
| F02K 1/12 | (2006.01) |
| F02C 9/18 | (2006.01) |
| F01D 17/14 | (2006.01) |
| F02K 3/04 | (2006.01) |
| F02K 3/06 | (2006.01) |
| F01D 17/08 | (2006.01) |

(52) U.S. Cl.
CPC ............... *F01D 17/08* (2013.01); *F02K 1/1207* (2013.01); *F02K 3/075* (2013.01); *F02C 9/18* (2013.01); *F01D 17/141* (2013.01); *F01D 17/14* (2013.01); *F02K 3/04* (2013.01); *F02K 3/06* (2013.01); *Y02T 50/671* (2013.01)
USPC .................. 60/204; 60/235; 60/226.3; 60/771

(58) Field of Classification Search
CPC ........... F02C 9/18; F02K 1/1207; F02K 3/04; F02K 3/06; F02K 3/075
USPC ........ 60/770, 226.3, 204, 262, 264, 242, 235, 60/237, 771, 232; 239/265.19; 181/213, 181/220
See application file for complete search history.

(56) References Cited

U.S. PATENT DOCUMENTS

| | | | | |
|---|---|---|---|---|
| 2,799,989 | A | * | 7/1957 | Kappus .................... 239/265.35 |
| 2,955,412 | A | * | 10/1960 | Rhodes .......................... 60/242 |
| 3,214,905 | A | * | 11/1965 | Waters et al. ............ 239/265.17 |
| 3,678,690 | A | * | 7/1972 | Shohet et al. ................... 60/239 |

(Continued)

FOREIGN PATENT DOCUMENTS

GB    2 374 121 A    10/2002

*Primary Examiner* — Ted Kim
(74) *Attorney, Agent, or Firm* — Oliff PLC

(57) ABSTRACT

A turbofan gas turbine engine (10) comprises a variable area exhaust nozzle (12) arranged at the downstream end of a casing (17). A control unit (66) analyzes the power produced by the gas turbine engine (10), the flight speed of the gas turbine engine (1) and/or the altitude of the gas turbine engine (10). The control unit (66) configures the variable area nozzle (12) at a first cross-sectional area (70A) when the flight speed of the gas turbine engine (10) is less than a first predetermined value. The control unit (66) configures the variable area nozzle (12) at a second, smaller, cross-sectional area (70B) when the flight speed of the gas turbine engine (10) is greater than the first predetermined value and the power produced by the gas turbine engine (10) is greater than a second predetermined value. The control unit (66) configures the variable area nozzle (12) at a third, intermediate, cross-sectional area (70C) when the flight speed of the gas turbine engine (10) is greater than the first predetermined value and the power produced by the gas turbine engine (10) is less than the second predetermined value.

26 Claims, 5 Drawing Sheets

(56) References Cited

U.S. PATENT DOCUMENTS

| | | | |
|---|---|---|---|
| 4,068,469 A * | 1/1978 | Adamson | 60/204 |
| 4,809,500 A * | 3/1989 | Roberts, Jr. | 60/235 |
| 4,947,643 A | 8/1990 | Pollak et al. | |
| 5,261,229 A * | 11/1993 | Ford et al. | 60/262 |
| 5,372,006 A * | 12/1994 | Lair | 60/226.2 |
| 5,778,659 A * | 7/1998 | Duesler et al. | 60/226.1 |
| 6,000,215 A * | 12/1999 | Roberts, Jr. | 60/235 |
| 6,270,037 B1 * | 8/2001 | Freese et al. | 60/235 |
| 6,546,716 B2 * | 4/2003 | Lair | 60/232 |
| 8,313,280 B2 * | 11/2012 | Hurwitz et al. | 60/204 |
| 2004/0006969 A1 | 1/2004 | Whurr | |
| 2010/0011740 A1 * | 1/2010 | McVey | 60/204 |

* cited by examiner

GAS TURBINE ENGINE VARIABLE AREA EXHAUST NOZZLE

The present invention relates to a gas turbine engine variable area exhaust nozzle and in particular to a variable area exhaust nozzle for an aircraft turbofan gas turbine engine.

It is known from our published UK patent application no. GB2374121A to provide a plurality of circumferentially arranged movable tabs at the downstream end of a turbofan gas turbine engine exhaust nozzle. The tabs are moved between a non-deployed and a deployed position to reduce exhaust noise while in the deployed position.

It is also known from GB2374121A to provide a plurality of circumferentially arranged fixed tabs and a plurality of circumferentially arranged movable tabs at the downstream end of the turbofan gas turbine engine exhaust nozzle. The fixed tabs and movable tabs are arranged circumferentially alternately. The movable tabs are moved between a non-deployed and a deployed position. The movable tabs reduce exhaust noise while in the deployed position. The movable tabs are circumferentially aligned with the fixed tabs in the non-deployed position to reduce aerodynamic drag.

It is also known from GB2374121A to provide a plurality of circumferentially arranged fixed tabs and a plurality of circumferentially arranged movable tabs at the downstream end of the turbofan gas turbine engine exhaust nozzle. The fixed tabs and movable tabs are arranged circumferentially alternately. The movable tabs are moved between a non-deployed and a deployed position. The fixed tabs reduce exhaust noise when the movable tabs are in the deployed position and the movable tabs increase the area of the nozzle to compensate for the reduction in the area due to the fixed tabs. The movable tabs are circumferentially aligned with the fixed tabs in the non-deployed position to reduce aerodynamic drag.

Accordingly the present invention seeks to provide a novel gas turbine engine variable area exhaust nozzle.

Accordingly the present invention provides a gas turbine engine comprising a casing defining a flow passage through the gas turbine engine, a variable area exhaust nozzle being arranged at the downstream end of the casing, means to measure the power produced by the gas turbine engine, means to measure the flight speed of the gas turbine engine or means to measure the altitude of the gas turbine engine, control means arranged to receive measurements of the power produced by the gas turbine engine, the flight speed of the gas turbine engine or the altitude of the gas turbine engine, the control means arranged to analyse the power produced by the gas turbine engine, the flight speed of the gas turbine engine or the altitude of the gas turbine engine, the control means arranged to configure the cross-sectional area of the variable area exhaust nozzle at a first cross-sectional area in a first mode of operation when the control means determines that the flight speed of the gas turbine engine or the altitude of the gas turbine engine is less than a first predetermined value, the control means is arranged to configure the cross-sectional area of the variable area exhaust nozzle at a second cross-sectional area in a second mode of operation when the control means determines that the flight speed of the gas turbine engine or the altitude of the gas turbine engine is equal to or greater than the first predetermined value and the power produced by the gas turbine engine is equal to or greater than a second predetermined value, and the control means is arranged to configure the cross-sectional area of the variable area exhaust nozzle at a third cross-sectional area in a third mode of operation when the control means determines that the flight speed of the gas turbine engine or the altitude of the gas turbine engine is equal to or greater than the first predetermined value and the power produced by the gas turbine engine is less than the second predetermined value, wherein the second cross-sectional area is less than the first cross-sectional area and the third cross-sectional area is greater than the second cross-sectional area and less than the first cross-sectional area.

Preferably the control means is arranged to determine if the power produced by the gas turbine engine has reduced in the third mode of operation of the gas turbine engine and the control means is arranged to configure the cross-sectional area of the variable area exhaust nozzle at a plurality of cross-sectional areas in the third mode of operation in response to a reduction in the power produced by the gas turbine engine.

Preferably the first cross-sectional area is a maximum cross-sectional area and the second cross-sectional area is a minimum cross-sectional area.

Preferably the means to measure the power produced by the gas turbine engine comprises one or more of means to measure a rotational speed of a shaft of the gas turbine engine, means to measure a pressure ratio of the gas turbine engine and means to measure a turbine entry temperature of the gas turbine engine.

The means to measure the power produced by the gas turbine engine may comprise means to measure the rotational speed of a fan shaft of the gas turbine engine and means to measure the temperature at the intake of the gas turbine engine and the control means determines the rotational speed of the fan shaft divided by the root of the temperature at the intake of the gas turbine engine.

The means to measure the pressure ratio of the gas turbine engine may comprise means to measure the pressure in a bypass duct of the gas turbine engine and means to measure the pressure at the intake of the gas turbine engine and the control means determines the pressure in the bypass duct of the gas turbine engine divided by the pressure at the intake of the gas turbine engine.

Preferably the casing is a fan casing and the variable area exhaust nozzle is a variable area fan nozzle.

Preferably the first mode of operation is take-off conditions, the second mode of operation is at high power conditions at high altitude and the third mode of operation is cruise conditions.

The present invention also provides a method of operating a gas turbine engine comprising a casing defining a flow passage through the gas turbine engine, a variable area exhaust nozzle being arranged at the downstream end of the casing, the method comprising measuring the power produced by the gas turbine engine, measuring the flight speed of the gas turbine engine or measuring the altitude of the gas turbine engine, analysing the power produced by the gas turbine engine, the flight speed of the gas turbine engine or the altitude of the gas turbine engine, configuring the cross-sectional area of the variable area exhaust nozzle at a first cross-sectional area in a first mode of operation when the flight speed of the gas turbine engine or the altitude of the gas turbine engine is less than a first predetermined value, configuring the cross-sectional area of the variable area exhaust nozzle at a second cross-sectional area in a second mode of operation when the flight speed of the gas turbine engine or the altitude of the gas turbine engine is equal to or greater than the first predetermined value and the power produced by the gas turbine engine is equal to or greater than a second predetermined value, and configuring the cross-sectional area of the variable area exhaust nozzle at a third cross-sectional area in a third mode of operation when the flight speed of the gas turbine engine or the altitude of the gas turbine engine is equal to or greater than the first predetermined value and the power produced by the gas turbine engine is less than the second predetermined value, wherein the second cross-sectional area is less than the first cross-sectional area and the third cross-sectional area is greater than the second cross-sectional area and less than the first cross-sectional area.

Preferably the method comprises determining if the power produced by the gas turbine engine has reduced in the third mode of operation of the gas turbine engine and configuring the cross-sectional area of the variable area exhaust nozzle at a plurality of cross-sectional areas in the third mode of operation in response to a reduction in the power produced by the gas turbine engine.

Preferably the first cross-sectional area is a maximum cross-sectional area and the second cross-sectional area is a minimum cross-sectional area.

Preferably measuring the power produced by the gas turbine engine comprises one or more of measuring rotational speed of a shaft of the gas turbine engine, measuring a pressure ratio of the gas turbine engine and measuring turbine entry temperature of the gas turbine engine.

The measuring of the power produced by the gas turbine engine may comprise measuring the rotational speed of a fan shaft of the gas turbine engine and measuring the temperature at the intake of the gas turbine engine and determining the rotational speed of the fan shaft divided by the root of the temperature at the intake of the gas turbine engine.

The measuring of the pressure ratio of the gas turbine engine may comprise measuring the pressure in a bypass duct of the gas turbine engine and measuring the pressure at the intake of the gas turbine engine and determining the pressure in the bypass duct of the gas turbine engine divided by the pressure at the intake of the gas turbine engine.

Preferably the casing is a fan casing and the variable area exhaust nozzle is a variable area fan nozzle.

Preferably the first mode of operation is take-off conditions, the second mode of operation is at high power conditions at high altitude and the third mode of operation is cruise conditions.

The present invention also provides a method of operating a gas turbine engine comprising a casing defining a flow passage through the gas turbine engine, a variable area exhaust nozzle being arranged at the downstream end of the casing, the method comprising in a first mode of operation arranging the cross-sectional area of the variable area exhaust nozzle at a maximum cross-sectional area, in a second mode of operation arranging the cross-sectional area of the variable area exhaust nozzle at a minimum cross-sectional area, and in a third mode of operation arranging the cross-sectional area of the variable area exhaust nozzle at an intermediate cross-sectional area, wherein the first mode of operation is take-off conditions, the second mode of operation is at high power conditions at high altitude and the third mode of operation is cruise conditions.

The present invention also provides a method of operating a gas turbine engine comprising a casing defining a flow passage through the gas turbine engine, a variable area exhaust nozzle being arranged at the downstream end of the casing, the variable area exhaust nozzle comprising a plurality of movable members arranged circumferentially around and extending in a downstream direction from the downstream end of the annular casing, in a first mode of operation maintaining the movable members in an un-actuated position, in a second mode of operation moving the movable members to a first actuated position, in a third mode of operation moving the movable members to second actuated position, moving the movable members generally radially outwardly from the un-actuated position to the first actuated position to increase the area of the variable area exhaust nozzle and moving the movable members generally radially inwardly from the un-actuated position to the actuated position to decrease the area of the variable area exhaust nozzle.

The present invention will be more fully described by way of example with reference to the accompanying drawings in which.

Figure 1:
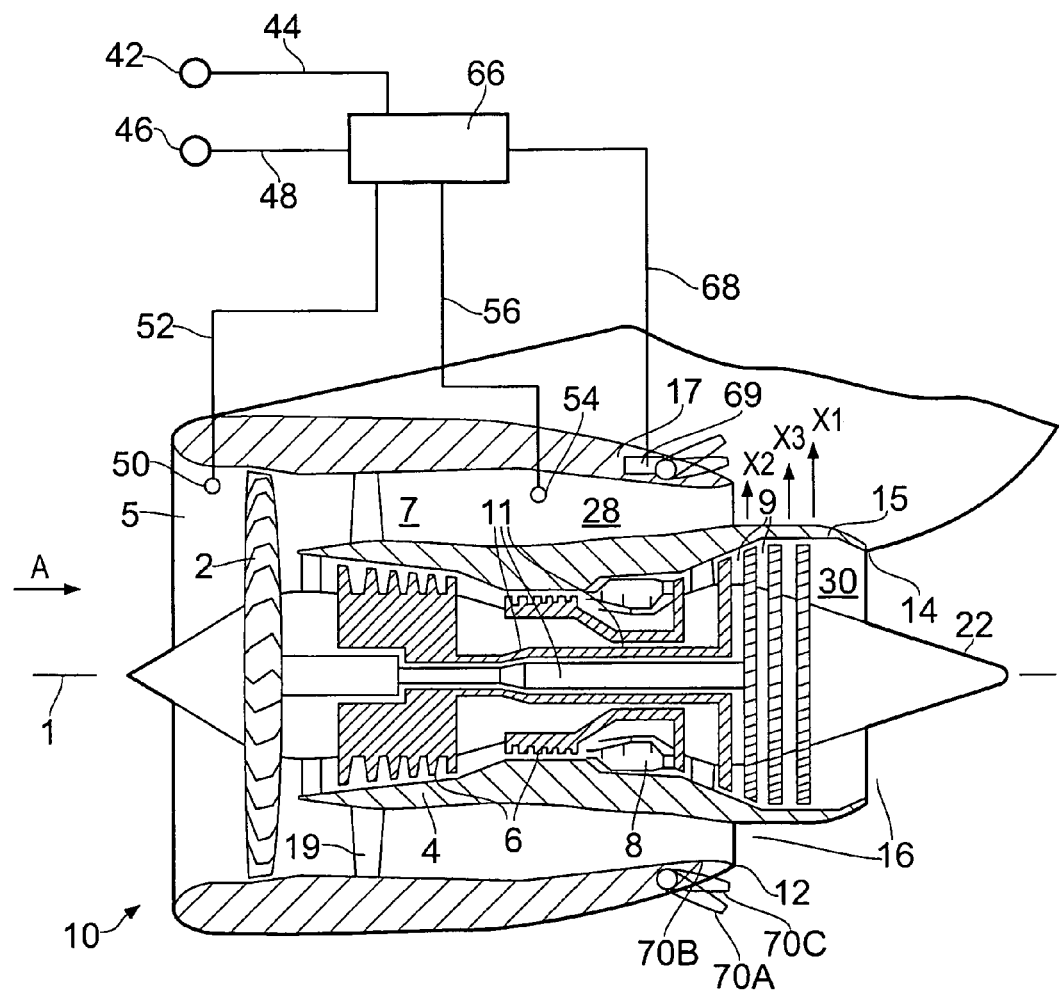
FIG. 1 shows a turbofan gas turbine engine having a variable area exhaust nozzle according to the present invention.

A turbofan gas turbine engine 10, as shown in FIG. 1, comprises in axial flow series an air intake 5, a propulsive fan 2, a core engine 4 and an exhaust nozzle assembly 16 all disposed coaxially about an engine axis 1. The core engine 4 comprises in axial flow series a series of compressors 6, a combustor 8 and a series of turbines 9. The direction of airflow through the turbofan gas turbine engine 10 in operation is indicated by arrow A and the terms upstream and downstream are used with reference to this general flow direction. Air is drawn through the air intake 5 and is compressed by the fan 2. The airflow from the fan 2 is split between a flow through the core engine 4 and a bypass flow. The flow through the core engine 4 flows through the compressors 6 where it is further compressed and into the combustor 8 where it is mixed with fuel and the fuel is burnt in the air in the combustor 8. The combustion of the fuel in the compressed air in the combustor 8 produces hot gases, which exit the combustor 8 and flow downstream through and drive the turbines 9. The turbines 9 drive the compressors 6 and fan 2 via shafts 11 which drivingly connect the turbines 9 with the compressors 6 and the fan 2.

The exhaust gases leaving the turbines 9 flow through the exhaust nozzle assembly 16 to provide propulsive thrust. The remainder of the air from the fan 2, the bypass flow, flows within a bypass duct 7 around the core engine 4. The bypass flow, which has been accelerated by the fan 2 also flows to the exhaust nozzle assembly 16 where it is exhausted, as a bypass exhaust stream to provide further, the majority of the, propulsive thrust.

The velocity of the bypass exhaust stream is significantly lower than the velocity of the core engine exhaust stream. Turbulent mixing of the bypass exhaust stream and the core engine exhaust stream occurs in the region of, and downstream of, the exhaust nozzle assembly 16. These two exhaust streams also mix with the ambient air surrounding and downstream of the exhaust nozzle assembly 16. This mixing of the two exhaust streams and the ambient air produces noise.

The exhaust nozzle assembly 16 comprises two concentric exhaust nozzles, a radially outer bypass, or fan, exhaust nozzle 12 and a radially inner core exhaust nozzle 14. The core exhaust nozzle 14 is defined at its radially outer extent by a generally frusto-conical core nozzle wall 15 and at its radially inner extent by a frusto-conical engine plug structure 22. The bypass, or fan, exhaust nozzle 12 is defined at its radially outer extent by a nacelle, or fan casing, 17 and at its radially inner extent by the core nozzle wall 15.

The bypass, or fan, exhaust nozzle 12 is a variable area fan exhaust nozzle. The bypass duct 7 is also defined at its radially outer extent by the nacelle, or casing, 17 and the nacelle, fan casing, 17 is generally annular and arranged coaxial with the engine axis 1. Thus the nacelle, fan casing, 17 defines a flow passage through the turbofan gas turbine engine 10. The bypass, or fan, variable area exhaust nozzle 12 is arranged at the downstream end of the nacelle, fan casing, 17.

The turbofan gas turbine engine 10 has means to measure the flight speed of the turbofan gas turbine engine 10 and the means to measure the flight speed comprises a sensor 42 to measure the flight speed, or Mach number, and the sensor 42 is positioned on an associated aircraft upon which the turbofan gas turbine engine 10 is mounted. The turbofan gas turbine engine 10 also has means to measure the altitude of the turbofan gas turbine engine 10 and the means to measure the altitude comprises a sensor 46, a pressure transducer, to measure the altitude and the sensor 46 is positioned on the associated aircraft upon which the turbofan gas turbine engine 10 is mounted. The turbofan gas turbine engine 10 also has means to measure the power produced by the turbofan gas turbine engine 10.

The means to measure the power produced by the turbofan gas turbine engine 10 comprises a sensor 50, a pressure transducer, to measure the pressure P20 at the intake 5 of the turbofan gas turbine engine 10, upstream of the fan 2 and a sensor 54, a pressure transducer, to measure the pressure, the total pressure, P135 in the bypass duct 7, downstream of fan outlet guide vanes 19 and upstream of the fan exhaust nozzle 14, in order to measure the engine pressure ratio of the turbofan gas turbine engine 10. The engine pressure ratio is P135/P20 or the pressure, or total pressure, in the bypass duct 7 divided by the pressure, or total pressure, at the intake 5 upstream of the fan 2. This is commonly known as bypass engine pressure ratio, or bypass EPR, and is a non dimensional parameter indicative of power. The sensors 42, 46, 50 and 54 supply signals/measurements to a control means 66 via connecting leads 44, 48, 52 and 56 respectively.

The control means 66 is arranged to analyse the measurements of pressure from the sensors 50 and 54 to determine the bypass engine pressure ratio, bypass EPR, and uses the bypass EPR as a measure of the power produced by the turbofan gas turbine engine 10. The control means 66 also receives measurements of the flight speed of the turbofan gas turbine engine 10 and the altitude of the turbofan gas turbine engine 10 from the sensors 42 and 46. The control means 66 is arranged to analyse the power produced by the turbofan gas turbine engine 10, the flight speed of the turbofan gas turbine engine 10 and/or the altitude of the turbofan gas turbine engine 10.

The control means 66 is arranged to configure the cross-sectional area of the variable area fan exhaust nozzle 12 at different cross-sectional areas in different modes of operation and in particular the control means 66 is arranged to send a signal via line 68 to an actuator 69. The actuator 69 may be a mechanical, hydraulic, pneumatic, electrical or other suitable actuator.

The control means 66 is arranged to configure the cross-sectional area of the variable area fan exhaust nozzle 12 at a first cross-sectional area 70A in a first mode of operation when the control means 66 determines that the flight speed of the turbofan gas turbine engine 10 and/or the altitude of the turbofan gas turbine engine 10 is less than a first predetermined value. The control means 66 is arranged to configure the cross-sectional area of the variable area fan exhaust nozzle 12 at a second cross-sectional area 70B in a second mode of operation when the control means 66 determines that the flight speed of the turbofan gas turbine engine 10 and/or the altitude of the turbofan gas turbine engine 10 is equal to or greater than the first predetermined value and the power produced by the turbofan gas turbine engine 10 is equal to or greater than a second predetermined value. The control means 66 is arranged to configure the cross-sectional area of the variable area fan exhaust nozzle 12 at a third cross-sectional area 70C in a third mode of operation when the control means 66 determines that the flight speed of the turbofan gas turbine engine 10 and/or the altitude of the turbofan gas turbine engine 10 is equal to or greater than the first predetermined value and the power produced by the turbofan gas turbine engine 10 is less than the second predetermined value. The first mode of operation is take-off conditions, the second mode of operation is at high power conditions at high altitude and the third mode of operation is cruise conditions.

The second cross-sectional area 70B of the variable area fan exhaust nozzle 12 is less than the first cross-sectional area 70A of the variable area fan exhaust nozzle 12 and the third cross-sectional area 70C of the variable area fan exhaust nozzle 12 is greater than the second cross-sectional area 70B of the variable area fan exhaust nozzle 12 and less than the first cross-sectional area 70A of the variable area fan exhaust nozzle 12. The first cross-sectional area 70A has a cross-sectional area denoted by radius X1, the second cross-sectional area 70B has a cross-sectional area denoted by radius X2 and the third cross-sectional area 70C has a cross-sectional area denoted by radius X3.

The control means 66 is also arranged to determine if the power produced by the turbofan gas turbine engine 10 has reduced in the third mode of operation, e.g. cruise conditions, of the turbofan gas turbine engine 10 and the control means 10 is arranged to configure the cross-sectional area of the variable area fan exhaust nozzle 12 at a plurality of cross-sectional areas in the third mode of operation in response to a reduction in the power produced by the turbofan gas turbine engine 10.

The first cross-sectional area 70A is a maximum cross-sectional area X1 of the variable area fan exhaust nozzle 12 and the second cross-sectional area 70B is a minimum cross-sectional area X2 of the variable area fan exhaust nozzle 12.

The present invention arranges the variable area fan exhaust nozzle 12 in the first position 70A during take-off for noise reduction and to improve fan flutter margin at take-off. The variable area fan exhaust nozzle 12 is in the second position 70B at high power conditions and at high altitude and/or at high speed, to reduce the turbine entry temperature and to reduce the speed of the fan shaft, this also reduces the maximum speed of the fan shaft and enables weight reductions in the fan and low pressure turbine and increases the life of the turbine. The variable area fan exhaust nozzle 12 is in the third position at cruise to provide the best, uncompromised, specific fuel consumption for the longest part of a flight. At cruise conditions the variable area fan exhaust nozzle 12 is preferably moved to one of a plurality of third positions, with different cross-sectional areas, to enable the cross-sectional area of the variable area fan exhaust nozzle 12 to be adjusted during cruise conditions. During the flight of an aircraft, fuel is burned and the weight of the aircraft gradually reduces and the power, the non-dimensional power, produced by the turbofan gas turbine engine is reduced accordingly. The cross-sectional area of the variable area fan exhaust nozzle 12 is changed, either reduced or increased, e.g. moved to the different third positions, during cruise conditions as the power produced by the turbofan gas turbine engine 12 reduces in order to maintain the operation of the fan nearer to maximum efficiency and to provide a further reduction in fuel consumption and an increase in efficiency. The different third positions of the variable area fan exhaust nozzle 12 are selected as the power produced by the turbofan gas turbine engine 12 reduces below predetermined power levels.

Figure 2:
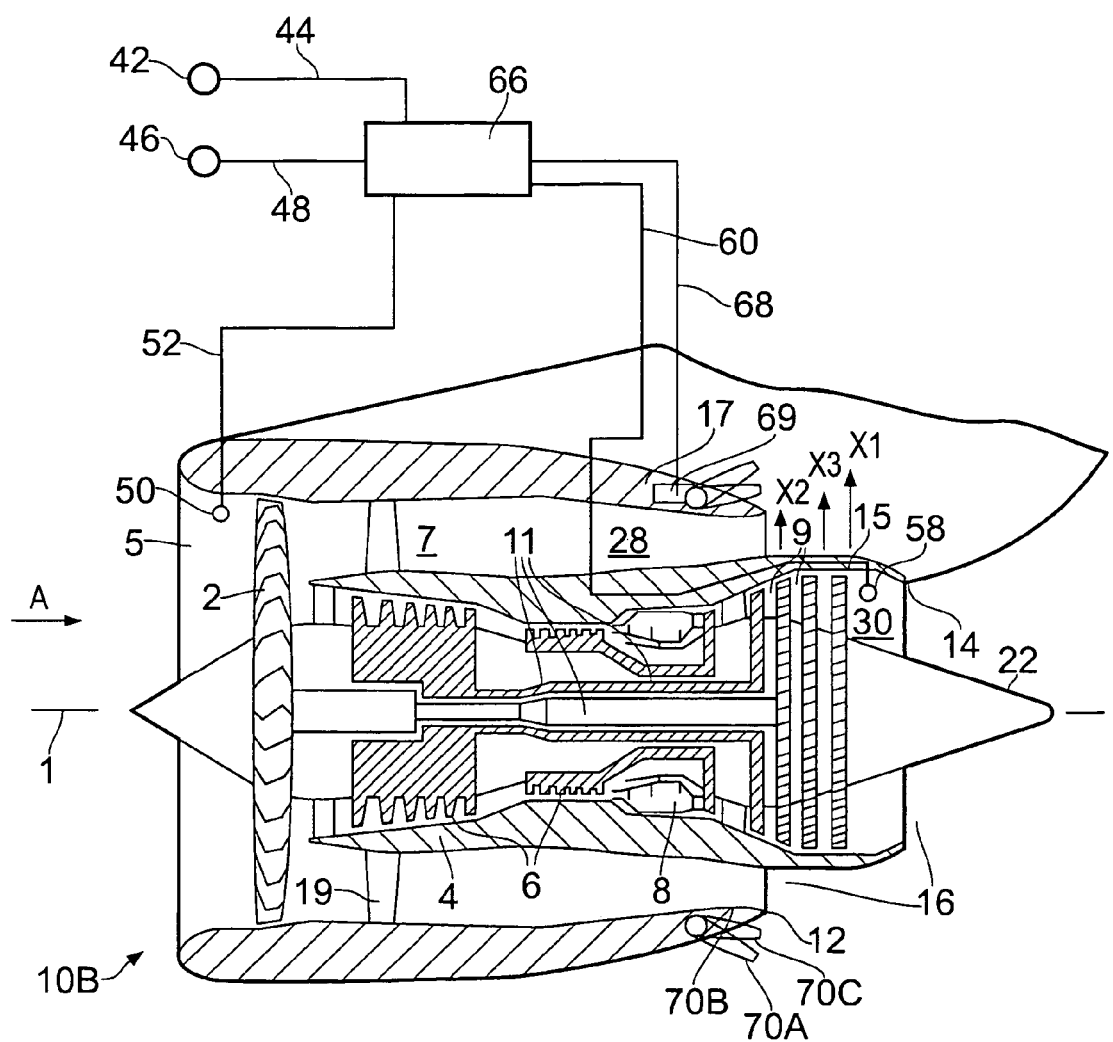
FIG. 2 shows a further turbofan gas turbine engine having a variable area exhaust nozzle according to the present invention.

FIG. 2 shows a further gas turbine engine according to the present invention and like parts are denoted by like numerals. In FIG. 2 the means to measure the power produced by the turbofan gas turbine engine 10B comprises the sensor 50, a pressure transducer, to measure the pressure P20 at the intake 5 of the turbofan gas turbine engine 10B, upstream of the fan 2 and a sensor 58, a pressure transducer, to measure the pressure P50 in the core engine flow, downstream of a low pressure turbine in the turbines 9 and upstream of the core exhaust nozzle 14, in order to measure the engine pressure ratio of the turbofan gas turbine engine 10B. The engine pressure ratio is P50/P20 or the pressure, or total pressure, in the core exhaust duct divided by the pressure, or total pressure, at the intake 5 upstream of the fan 2. This is commonly known as engine pressure ratio, or EPR, and is a non dimensional parameter indicative of power. The sensors 42, 46, 50 and 58 supply signals/measurements to the control means 66 via connecting leads 44, 48, 52 and 60 respectively.

The control means 66 is arranged to analyse the measurements of pressure from the sensors 50 and 58 to determine the engine pressure ratio, EPR, and uses the EPR as a measure of the power produced by the turbofan gas turbine engine 10B. The control means 66 also receives measurements of the flight speed of the turbofan gas turbine engine 10B and the altitude of the turbofan gas turbine engine 10B from the sensors 42 and 46. The control means 66 is arranged to analyse the power produced by the turbofan gas turbine engine 10B, the flight speed of the turbofan gas turbine engine 10B and the altitude of the turbofan gas turbine engine 10B. The control means 66 then varies the area of the variable area fan exhaust nozzle 12 in a similar manner to that described with reference to FIG. 1.

Figure 3:
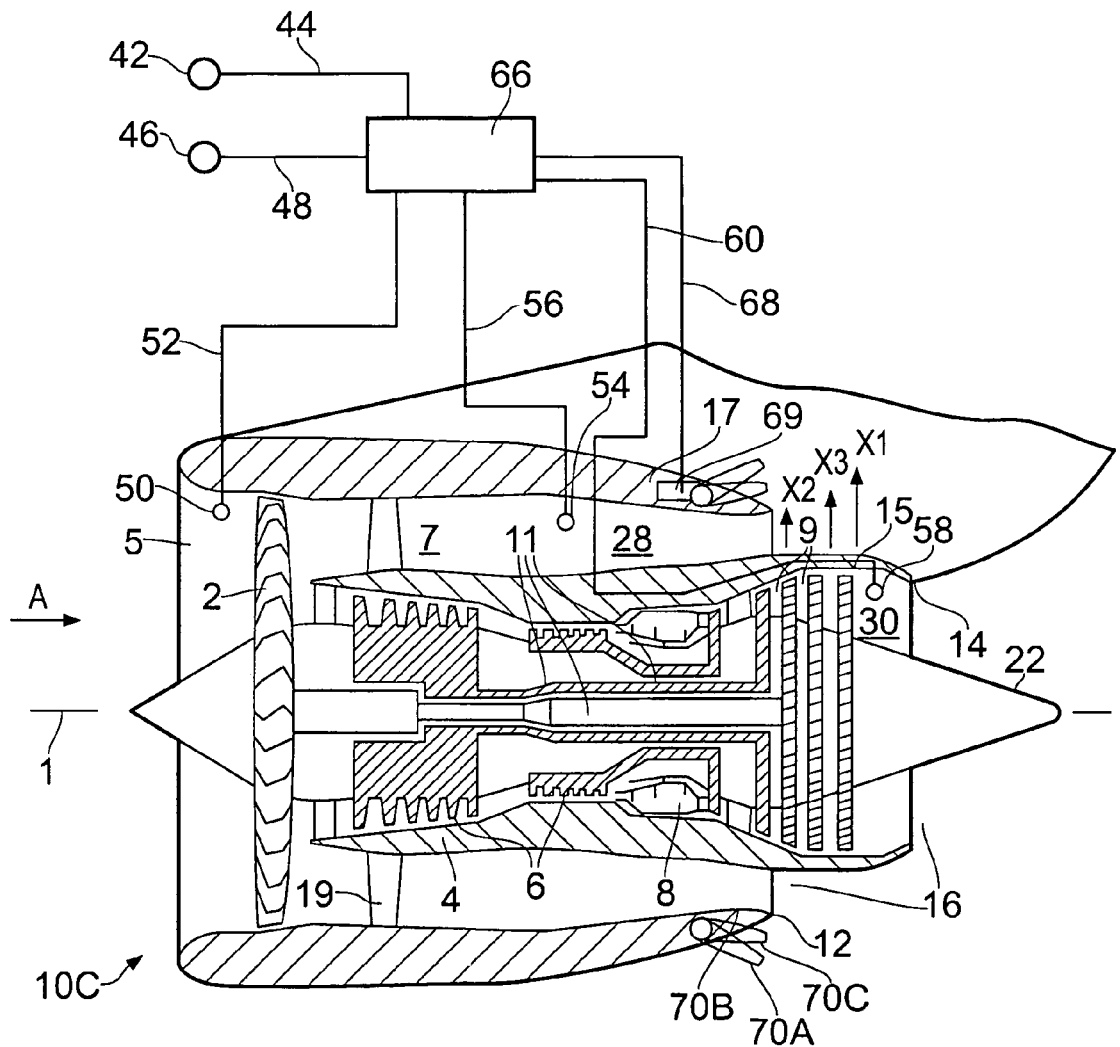
FIG. 3 shows another turbofan gas turbine engine having a variable area exhaust nozzle according to the present invention.

FIG. 3 shows an alternative gas turbine engine according to the present invention and like parts are denoted by like numerals. In FIG. 3 the means to measure the power produced by the turbofan gas turbine engine 10C comprises the sensor 50, a pressure transducer, to measure the pressure P20 at the intake 5 of the turbofan gas turbine engine 10C, upstream of the fan 2, a sensor 54, a pressure transducer, to measure the pressure, the total pressure, P135 in the bypass duct 7, downstream of fan outlet guide vanes 19 and upstream of the fan exhaust nozzle 14 and a sensor 58, a pressure transducer, to measure the pressure P50 in the core engine flow, downstream of a low pressure turbine in the turbines 9 and upstream of the core exhaust nozzle 14, in order to measure the engine pressure ratio of the turbofan gas turbine engine 10C. This engine pressure ratio uses a combination of the bypass engine pressure ratio and the engine pressure ratio. This engine pressure combines the two versions described above in a certain way using their contributions to the thrust of the turbofan gas turbine engine 10C. For example the integrated, or combined, engine pressure ratio, IEPR=(A×P50/P20)+(B×P135/P20), where A and B are chosen to sum to one and are related to the outlet areas of the core exhaust nozzle 14 and the bypass exhaust nozzle 12. P50/P20 is the pressure, or total pressure, in the core exhaust duct divided by the pressure, or total pressure, at the intake upstream of the fan and P135/P20 is the pressure, or total pressure, in the bypass duct divided by the pressure, or total pressure, at the intake upstream of the fan. This is commonly known as the integrated, or combined, engine pressure ratio, or IEPR, and is a non dimensional parameter indicative of power. The sensors 42, 46, 50, 54 and 58 supply signals/measurements to the control means 66 via connecting leads 44, 48, 52, 56 and 60 respectively.

The control means 66 is arranged to analyse the measurements of pressure from the sensors 50, 56 and 58 to determine the integrated, or combined, engine pressure ratio, IEPR, and uses the IEPR as a measure of the power produced by the turbofan gas turbine engine 10C. The control means 66 also receives measurements of the flight speed of the turbofan gas turbine engine 10C and the altitude of the turbofan gas turbine engine 10C from the sensors 42 and 46. The control means 66 is arranged to analyse the power produced by the turbofan gas turbine engine 10C, the flight speed of the turbofan gas turbine engine 10C and the altitude of the turbofan gas turbine engine 10C. The control means 66 then varies the area of the variable area fan exhaust nozzle 12 in a similar manner to that described with reference to FIG. 1.

Figure 4:
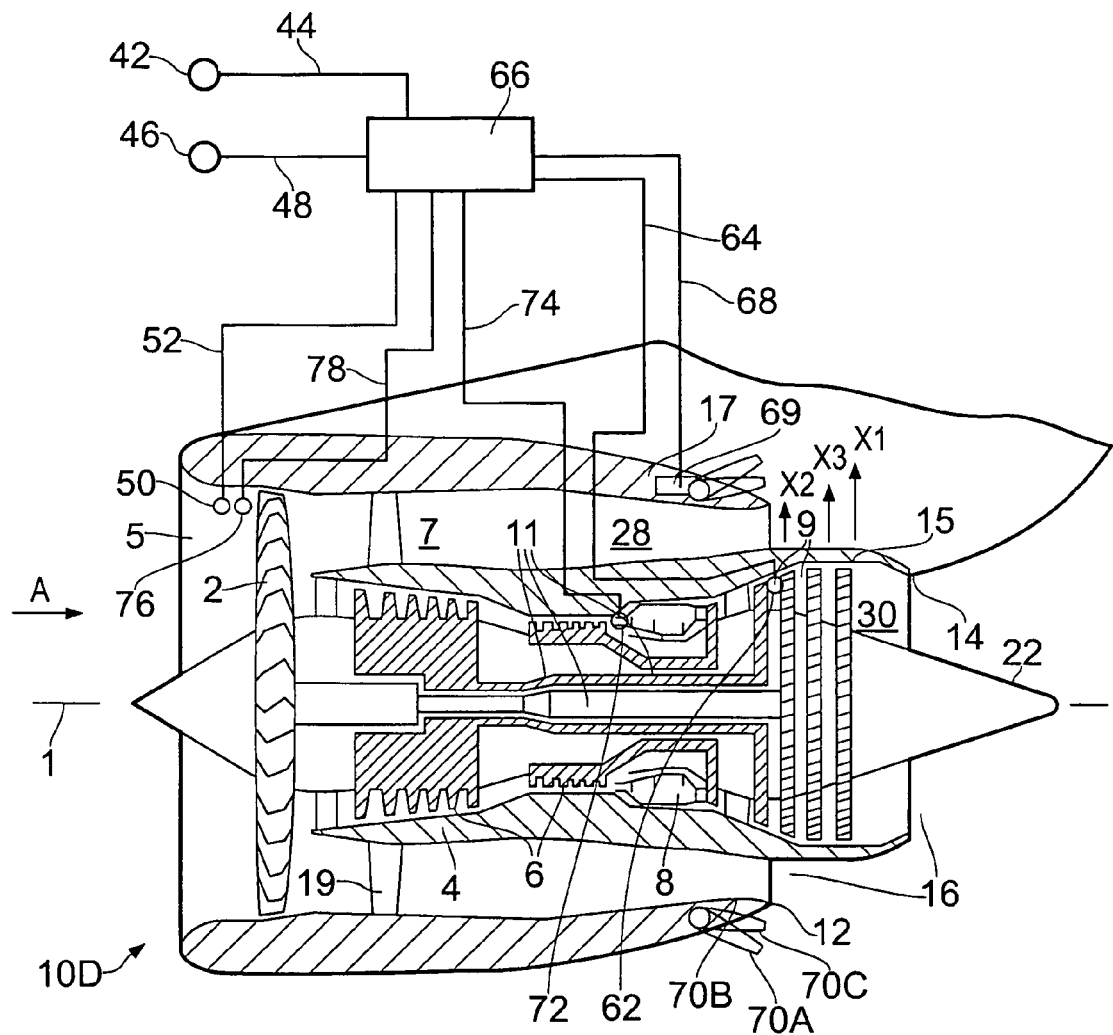
FIG. 4 shows an additional turbofan gas turbine engine having a variable area exhaust nozzle according to the present invention.

FIG. 4 shows an alternative gas turbine engine according to the present invention and like parts are denoted by like numerals. In FIG. 4 the means to measure the power produced by the turbofan gas turbine engine 10D uses the power potential of the gas entering the low pressure turbine and comprises the sensor 50, a pressure transducer, to measure the pressure, free stream total pressure, P20 at the intake 5 of the turbofan gas turbine engine 10D, upstream of the fan 2, a sensor 62, a temperature transducer, to measure the temperature TGT at the entrance to the low pressure turbine of the turbines 9, upstream of the low pressure turbine and downstream of the intermediate pressure turbine or upstream of the low pressure turbine and downstream of the high pressure turbine, a sensor 72, a pressure transducer, to measure the pressure, static pressure or total pressure, P30 in the core engine flow, downstream of a high pressure compressor in the compressors 6 and upstream of the combustor 8 and a sensor 76, a temperature transducer, to measure the temperature, free stream total temperature, T20 at the intake 5 of the turbofan gas turbine engine 10, upstream of the fan 2. The sensors 42, 46, 50, 62, 72 and 76 supply signals/measurements to the control means 66 via connecting leads 44, 48, 52, 64, 74 and 78 respectively.

The control means 66 is arranged to analyse the measurements of pressure and temperature from the sensors 50, 62, 72 and 76 to determine the turbine power ratio and to use this as a measure of the power produced by the turbofan gas turbine engine 10D. The control means 66 determines the turbine power ratio TPR, where TPR=(P30×√TGT)/(P20×√T20). The control means 66 also receives measurements of the flight speed of the turbofan gas turbine engine 10D and the altitude of the turbofan gas turbine engine 10D from the sensors 42 and 46. The control means 66 is arranged to analyse the power produced by the turbofan gas turbine engine 10D, the flight speed of the turbofan gas turbine engine 10D and the altitude of the turbofan gas turbine engine 10D. The control means 66 then varies the area of the variable area fan exhaust nozzle 12 in a similar manner to that described with reference to FIG. 1.

Figure 5:
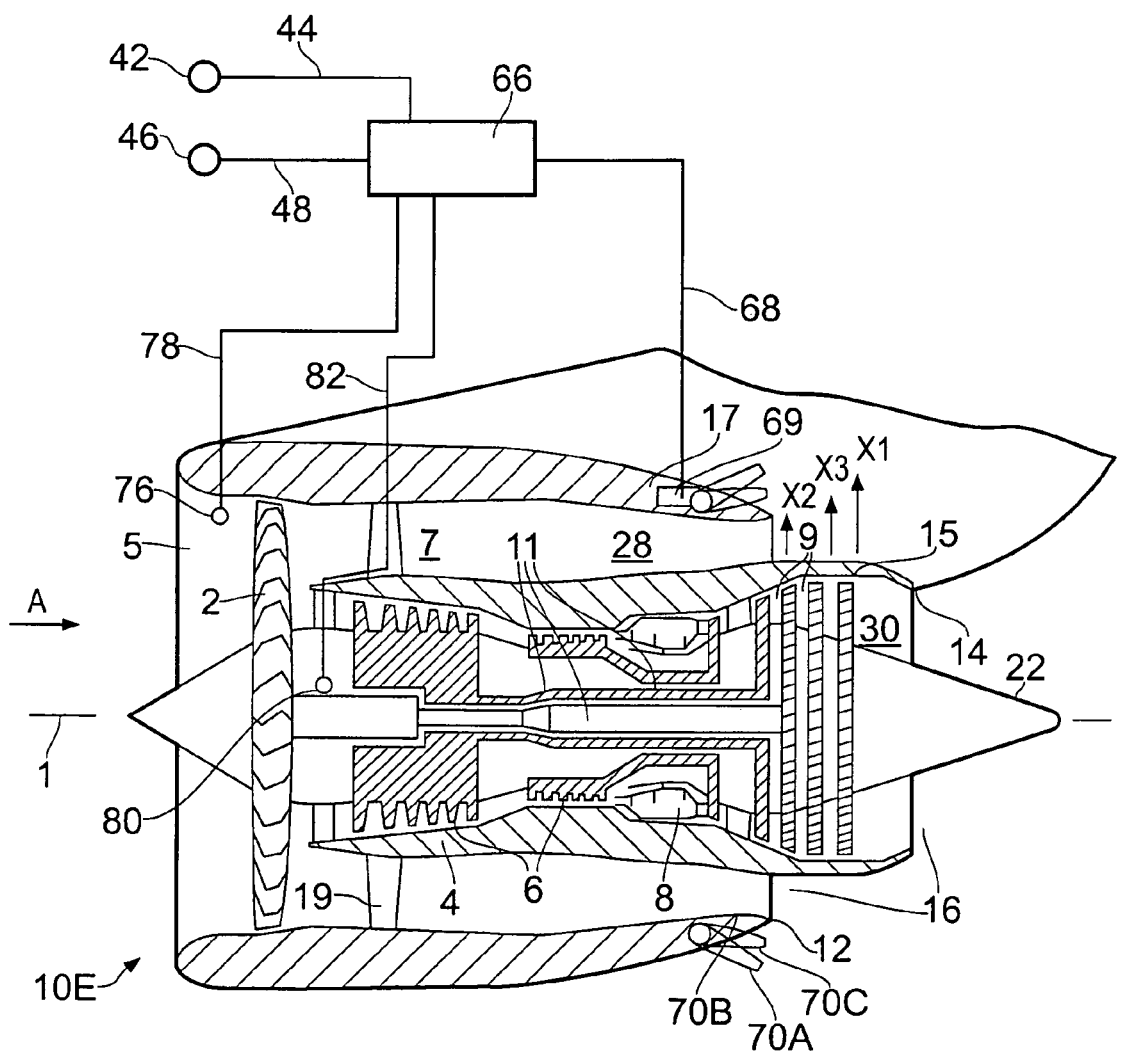
FIG. 5 shows a final turbofan gas turbine engine having a variable area exhaust nozzle according to the present invention.

FIG. 5 shows an alternative gas turbine engine according to the present invention and like parts are denoted by like numerals. In FIG. 5 the means to measure the power produced by the turbofan gas turbine engine 10E comprises the sensor 76, a temperature transducer, to measure the temperature, the free stream total temperature, T20 at the intake 5 of the turbofan gas turbine engine 10E, upstream of the fan 2 and a sensor 80, a speed sensor, to measure the rotational speed NL of the shaft driving the fan 2. The sensors 42, 46, 76 and 80 supply signals/measurements to the control means 66 via connecting leads 44, 48, 78 and 82 respectively.

The control means 66 is arranged to analyse the measurements of temperature and the rotational speed of the fan from the sensors 76 and 82 to determine the corrected fan speed and to use this as a measure of the power produced by the turbofan gas turbine engine 10E. The control means 66 determines the corrected fan speed=$NL/\sqrt{T20}$. The control means 66 also receives measurements of the flight speed of the turbofan gas turbine engine 10E and the altitude of the turbofan gas turbine engine 10E from the sensors 42 and 46. The control means 66 is arranged to analyse the power produced by the turbofan gas turbine engine 10E, the flight speed of the turbofan gas turbine engine 10E and the altitude of the turbofan gas turbine engine 10E. The control means 66 then varies the area of the variable area fan exhaust nozzle 12 in a similar manner to that described with reference to FIG. 1.

Other parameters indicative of engine power, or thrust, either dimensional or non dimensional may be used in accordance with the present invention.

Although the present invention has been described with reference to a variable area fan exhaust nozzle of a turbofan gas turbine engine it may equally well be applied to a variable area core exhaust nozzle of a turbofan gas turbine engine or it may be applied to both the variable area fan exhaust nozzle and the variable area core exhaust nozzle of a turbofan gas turbine engine. The present invention is also applicable to a combined, or mixed, variable area exhaust nozzle for a turbofan gas turbine engine. A combined, or mixed, variable area exhaust nozzle is a version of a variable area fan exhaust nozzle in which a variable area fan exhaust nozzle is positioned downstream of a core exhaust nozzle of a turbofan gas turbine engine and thus variation of the fan exhaust nozzle affects both the fan and the core. The present invention is equally applicable to a variable area core exhaust nozzle of a turbojet gas turbine engine or a variable area core nozzle of a turboprop gas turbine engine.

The invention claimed is:

1. A gas turbine engine comprising:
   a casing defining a flow passage through the gas turbine engine;
   a variable area exhaust nozzle being arranged at the downstream end of the casing, the variable area exhaust nozzle having a downstream end and a cross-sectional area measured at the downstream end of the variable area exhaust nozzle;
   a power sensor configured to measure the power produced by the gas turbine engine;
   a flight speed sensor configured to measure the flight speed of the gas turbine engine or an altitude sensor configured to measure the altitude of the gas turbine engine;
   a control device configured to receive measurements of the power produced by the gas turbine engine, the flight speed of the gas turbine engine or the altitude of the gas turbine engine,
   the control device configured to analyse the power produced by the gas turbine engine, the flight speed of the gas turbine engine or the altitude of the gas turbine engine,
   the control device configured to configure the cross-sectional area of the variable area exhaust nozzle at a first cross-sectional area in a first mode of operation when the control device determines that the flight speed of the gas turbine engine or the altitude of the gas turbine engine is less than a first predetermined value,
   the control device configured to configure the cross-sectional area of the variable area exhaust nozzle at a second cross-sectional area that is greater than zero in a second mode of operation when the control device determines that the flight speed of the gas turbine engine or the altitude of the gas turbine engine is equal to or greater than the first predetermined value and the power produced by the gas turbine engine is equal to or greater than a second predetermined value, and
   the control device is arranged to configure the cross-sectional area of the variable area exhaust nozzle at a third cross-sectional area in a third mode of operation when the control device determines that the flight speed of the gas turbine engine or the altitude of the gas turbine engine is equal to or greater than the first predetermined value and the power produced by the gas turbine engine is less than the second predetermined value, wherein
   the second cross-sectional area is less than both the first cross-sectional area and the third cross-sectional area and the third cross-sectional area is less than the first cross-sectional area.

2. The gas turbine engine as claimed in claim 1, wherein the control device is configured to determine if the power produced by the gas turbine engine has reduced in the third mode of operation of the gas turbine engine, and the control device is configured to configure the cross-sectional area of the variable area exhaust nozzle at a plurality of cross-sectional areas in the third mode of operation in response to a reduction in the power produced by the gas turbine engine.

3. The gas turbine engine as claimed in claim 1, wherein the first cross-sectional area is a maximum cross-sectional area and the second cross-sectional area is a minimum cross-sectional area.

4. The gas turbine engine as claimed in claim 1, wherein the power sensor includes one of a rotational speed sensor configured to measure a rotational speed of a shaft of the gas turbine engine, a pressure sensor configured to measure a pressure ratio of the gas turbine engine, and turbine entry temperature sensor configured to measure turbine entry temperature of the gas turbine engine.

5. The gas turbine engine as claimed in claim 4, wherein the power sensor includes a sensor configured to measure the rotational speed of a fan shaft of the gas turbine engine and a sensor configured to measure the temperature at the intake of the gas turbine engine, and the control device determines the rotational speed of the fan shaft divided by the root of the temperature at the intake of the gas turbine engine.

6. The gas turbine engine as claimed in claim 4, wherein the pressure sensor includes a bypass pressure sensor configured to measure the pressure in a bypass duct of the gas turbine engine and an intake pressure sensor configured to measure the pressure at the intake of the gas turbine engine, and the control device determines the pressure in the bypass duct of the gas turbine engine divided by the pressure at the intake of the gas turbine engine.

7. The gas turbine engine as claimed in claim 1, wherein the casing is a fan casing and the variable area exhaust nozzle is a variable area fan nozzle.

8. The gas turbine engine as claimed in claim 7, further comprising:
   an intake being arranged at the upstream end of the fan casing,
   wherein the fan casing extends from the intake to the variable area fan exhaust nozzle without a further air intake.

9. The gas turbine engine as claimed in claim 1, wherein the first mode of operation is take-off conditions, the second mode of operation is at high power conditions at high altitude and the third mode of operation is at cruise conditions.

10. The gas turbine engine as claimed in claim 1, wherein the gas turbine engine is a turbofan gas turbine engine having a fan and a core engine, the core engine having a core exhaust nozzle and the fan having a fan exhaust nozzle, the fan exhaust nozzle being arranged around the core exhaust nozzle, the casing is a fan casing and the variable area exhaust nozzle is the fan exhaust nozzle.

11. The gas turbine engine as claimed in claim 10, wherein the core engine comprising a series of compressors, a combustor and a series of turbines, all of the turbines being arranged in flow series, an intake being arranged at the upstream end of the fan casing, the fan casing extending from the intake to the variable area fan exhaust nozzle without a further air intake, the variable area fan exhaust nozzle having a downstream end and a cross-sectional area, the cross-sectional area being at the downstream end of the variable area fan exhaust nozzle, and the second cross-sectional area of the variable area fan exhaust nozzle is greater than zero.

12. A method of operating a gas turbine engine having a casing defining a flow passage through the gas turbine engine, a variable area exhaust nozzle being arranged at the downstream end of the casing, the variable area exhaust nozzle having a downstream end and a cross-sectional area measured at the downstream end of the variable area exhaust nozzle, the method comprising:
measuring the power produced by the gas turbine engine,
measuring the flight speed of the gas turbine engine or measuring the altitude of the gas turbine engine,
analysing the power produced by the gas turbine engine, the flight speed of the gas turbine engine or the altitude of the gas turbine engine,
configuring the cross-sectional area of the variable area exhaust nozzle at a first cross-sectional area in a first mode of operation when the flight speed of the gas turbine engine or the altitude of the gas turbine engine is less than a first predetermined value,
configuring the cross-sectional area of the variable area exhaust nozzle at a second cross-sectional area that is greater than zero in a second mode of operation when the flight speed of the gas turbine engine or the altitude of the gas turbine engine is equal to or greater than the first predetermined value and the power produced by the gas turbine engine is equal to or greater than a second predetermined value, and
configuring the cross-sectional area of the variable area exhaust nozzle at a third cross-sectional area in a third mode of operation when the flight speed of the gas turbine engine or the altitude of the gas turbine engine is equal to or greater than the first predetermined value and the power produced by the gas turbine engine is less than the second predetermined value, wherein
the second cross-sectional area is less than the first cross-sectional area and the third cross-sectional area is greater than the second cross-sectional area and less than the first cross-sectional area.

13. The method as claimed in claim 12, further comprising:
determining if the power produced by the gas turbine engine has reduced in the third mode of operation of the gas turbine engine and configuring the cross-sectional area of the variable area exhaust nozzle at a plurality of cross-sectional areas in the third mode of operation in response to a reduction in the power produced by the gas turbine engine.

14. The method as claimed in claim 12, wherein the first cross-sectional area is a maximum cross-sectional area and the second cross-sectional area is a minimum cross-sectional area.

15. The method as claimed in claim 9, wherein measuring the power produced by the gas turbine engine includes at least one of measuring a rotational speed of a shaft of the gas turbine engine, measuring a pressure ratio of the gas turbine engine, and measuring turbine entry temperature of the gas turbine engine.

16. The method as claimed in claim 15, wherein measuring the power produced by the gas turbine engine includes measuring the rotational speed of a fan shaft of the gas turbine engine, measuring the temperature at the intake of the gas turbine engine, and determining the rotational speed of the fan shaft divided by the root of the temperature at the intake of the gas turbine engine.

17. The method as claimed in claim 15, wherein measuring the pressure ratio of the gas turbine engine includes measuring the pressure in a bypass duct of the gas turbine engine, measuring the pressure at the intake of the gas turbine engine, and determining the pressure in the bypass duct of the gas turbine engine divided by the pressure at the intake of the gas turbine engine.

18. The method as claimed in claim 12, wherein the casing is a fan casing and the variable area exhaust nozzle is a variable area fan nozzle.

19. The method as claimed in claim 18, wherein the gas turbine engine includes:
an intake being arranged at an upstream end of the fan casing, and
the fan casing extends from the intake to the variable area fan exhaust nozzle without a further air intake.

20. The method as claimed in claim 12, wherein the first mode of operation is take-off conditions, the second mode of operation is at high power conditions at high altitude and the third mode of operation is cruise conditions.

21. The method of operating a gas turbine engine as claimed in claim 12, wherein the gas turbine engine is a turbofan gas turbine engine having a fan and a core engine, the core engine having a core exhaust nozzle and the fan having a fan exhaust nozzle, the fan exhaust nozzle being arranged around the core exhaust nozzle, the casing is a fan casing and the variable area nozzle is the fan exhaust nozzle.

22. The method as claimed in claim 21, wherein the core engine comprising a series of compressors, a combustor and a series of turbines, all of the turbines being arranged in flow series, an intake being arranged at the upstream end of the fan casing, the fan casing extending from the intake to the variable area fan exhaust nozzle without a further air intake, the variable area fan exhaust nozzle having a downstream end and a cross-sectional area, the cross-sectional area being at the downstream end of the variable area fan exhaust nozzle, and the second cross-sectional area of the variable area fan exhaust nozzle is greater than zero.

23. A method of operating a turbofan gas turbine engine having a fan and a core engine, the core engine having a core exhaust nozzle and the fan having a fan exhaust nozzle, the fan exhaust nozzle being arranged around the core exhaust nozzle, a fan casing defining a flow passage through the turbofan gas turbine engine, and a variable area fan exhaust nozzle being arranged at the downstream end of the fan casing, the variable area fan exhaust nozzle having downstream end and a cross-sectional area measured at the downstream end of the variable area fan exhaust nozzle, the method comprising:
in a first mode of operation, arranging the cross-sectional area of the variable area fan exhaust nozzle at a maximum cross-sectional area, in a second mode of operation, arranging the cross-sectional area of the variable area fan exhaust nozzle at a minimum cross-sectional area that is greater than zero, and in a third mode of operation, arranging the cross-sectional area of the variable area fan exhaust nozzle at an intermediate cross-sectional area, wherein the first mode of operation is take-off conditions, the second mode of operation is at high power conditions at high altitude, the third mode of operation is cruise conditions, and the second mode of operation is at a higher power than the third mode of operation.

24. The method as claimed in claim 23, wherein the gas turbine engine includes:

an intake being arranged at an upstream end of the fan casing, and the fan casing extends from the intake to the variable area fan exhaust nozzle without a further air intake.

25. A method of operating a turbofan gas turbine engine comprising a fan and a core engine, the core engine having a core exhaust nozzle and the fan having a fan exhaust nozzle, the core engine comprising a series of compressors, a combustor and a series of turbines, all of the turbines being arranged in flow series, the fan exhaust nozzle being arranged around the core exhaust nozzle, a fan casing having an upstream end and a downstream end, the fan casing defining a flow passage through the turbofan gas turbine engine, a variable area fan exhaust nozzle arranged at the downstream end of the fan casing, the variable area fan exhaust nozzle having a downstream end and a cross-sectional area measured at the downstream end of the variable area fan exhaust nozzle, the method comprising:

in a first mode of operation arranging the cross-sectional area of the variable area fan exhaust nozzle at a maximum cross-sectional area;

in a second mode of operation arranging the cross-sectional area of the variable area fan exhaust nozzle at a minimum cross-sectional area, the second cross-sectional area of the variable area fan exhaust nozzle is greater than zero; and in a third mode of operation arranging the cross-sectional area of the variable area fan exhaust nozzle at an intermediate cross-sectional area, wherein the first mode of operation is take-off conditions, the second mode of operation is at high power conditions at high altitude, the third mode of operation is cruise conditions, and the second mode of operation is at a higher power than the third mode of operation.

26. The method as claimed in claim 25, wherein the turbofan gas turbine engine includes:

an intake being arranged at the upstream end of the fan casing, and the fan casing extends from the intake to the variable area fan exhaust nozzle without a further air intake.

* * * * *